US009450228B2

(12) United States Patent
Sakai et al.

(10) Patent No.: US 9,450,228 B2
(45) Date of Patent: Sep. 20, 2016

(54) CATHODE ACTIVE MATERIAL, POSITIVE ELECTRODE FOR LITHIUM ION SECONDARY BATTERY, AND LITHIUM ION SECONDARY BATTERY

(71) Applicant: Asahi Glass Company, Limited, Chiyoda-ku (JP)

(72) Inventors: Tomohiro Sakai, Chiyoda-ku (JP); Tsubasa Takasugi, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 14/745,934

(22) Filed: Jun. 22, 2015

(65) Prior Publication Data
US 2016/0028072 A1     Jan. 28, 2016

(30) Foreign Application Priority Data

Jul. 23, 2014     (JP) ................................. 2014-149929

(51) Int. Cl.
*H01M 4/131*     (2010.01)
*H01M 4/36*      (2006.01)
*H01M 4/505*     (2010.01)
(Continued)

(52) U.S. Cl.
CPC .............. *H01M 4/131* (2013.01); *C01G 53/50* (2013.01); *H01M 4/364* (2013.01); *H01M 4/505* (2013.01); *H01M 4/525* (2013.01); *H01M 4/623* (2013.01); *H01M 4/625* (2013.01); *C01P 2002/50* (2013.01); *C01P 2002/52* (2013.01); *C01P 2002/74* (2013.01); *C01P 2002/76* (2013.01); *C01P 2004/03* (2013.01); *C01P 2004/51* (2013.01); *C01P 2004/61* (2013.01); *C01P 2006/12* (2013.01); *C01P 2006/40* (2013.01); *H01M 4/621* (2013.01); *H01M 4/624* (2013.01); *H01M 2004/028* (2013.01)

(58) Field of Classification Search
CPC .... H01M 4/131; H01M 4/505; H01M 4/525; H01M 4/621; H01M 4/624; H01M 4/364; H01M 2004/028; H01M 4/623; H01M 4/625; Y02E 60/122

See application file for complete search history.

(56) References Cited

U.S. PATENT DOCUMENTS 6,699,618 B2   3/2004   Noda et al.
6,890,456 B2   5/2005   Noda et al.
(Continued)

FOREIGN PATENT DOCUMENTS

JP     2014-7034      1/2014
WO    WO 01/04975    1/2001
(Continued)

*Primary Examiner* — Laura Weiner
(74) *Attorney, Agent, or Firm* — Oblon, McClelland, Maier & Neustadt, L.L.P.

(57) ABSTRACT

A cathode active material comprising secondary particles having a plurality of primary particles of a lithium-containing composite oxide agglomerated, the lithium-containing composite oxide being represented by $Li_xNi_aCo_bMn_cM_dO_y$, (x: 1.1 to 1.7, a: 0.15 to 0.5, b: 0 to 0.33, c: 0.33 to 0.85, M: another metal element, d: 0 to 0.05, a+b+c+d=1, and y: the number of moles of oxygen atom (O) required to satisfy the valences of the metal elements), and $I_{020}/I_{003}$ in an X-ray diffraction pattern being from 0.02 to 0.3, wherein the porosity in a cross section of the secondary particles is from 5 to 20%, and the percentage of the maximum void in a cross section of the secondary particles is from 0.1 to 10%.

5 Claims, 1 Drawing Sheet

(51) Int. Cl.
*H01M 4/525* (2010.01)
*H01M 4/62* (2006.01)
*C01G 53/00* (2006.01)
*H01M 4/02* (2006.01)

(56) References Cited

U.S. PATENT DOCUMENTS 7,090,822 B2   8/2006   Noda et al.

2011/0318640 A1   12/2011   Sugiura et al.

FOREIGN PATENT DOCUMENTS

| WO | WO 2011/031546 A2 | 3/2011 |
| WO | WO 2011/162251 A1 | 12/2011 |
| WO | WO 2012/091015 A1 | 7/2012 |
| WO | WO 2014/192758 A1 | 12/2014 |
| WO | WO 2014/192759 * | 12/2014 |
| WO | WO 2014/192759 A1 | 12/2014 |
| WO | WO 2015/064478 A1 | 5/2015 |

* cited by examiner

CATHODE ACTIVE MATERIAL, POSITIVE ELECTRODE FOR LITHIUM ION SECONDARY BATTERY, AND LITHIUM ION SECONDARY BATTERY

FIELD OF INVENTION

The present invention relates to a cathode active material, a positive electrode for a lithium ion secondary battery containing the cathode active material, and a lithium ion secondary battery comprising the positive electrode.

BACKGROUND ART

As a cathode active material contained in a positive electrode of a lithium ion secondary battery, a lithium-containing composite oxide particularly $LiCoO_2$ is well known. However, in recent years, for a lithium ion secondary battery for portable electronic instruments or for vehicles, downsizing and weight saving are required, and a further improvement in the discharge capacity of a lithium ion secondary battery per unit mass of the cathode active material (hereinafter sometimes referred to simply as discharge capacity) is required.

As a cathode active material which may further increase the discharge capacity of a lithium ion secondary battery, a cathode active material having high Li and Mn contents i.e. a so-called lithium rich cathode active material attracts attention.

As a lithium rich cathode active material, for example, the following have been proposed.

(i) A cathode active material having an $\alpha$-$NaFeO_2$ crystal structure, represented by $Li_{1+\alpha}Me_{1-\alpha}O_2$ (wherein Me is a transition metal element containing Co, Ni and Mn, $\alpha>0$, the molar ratio of Li to the transition metal element (Li/Me) is from 1.2 to 1.6, the molar ratio of Co to the transition metal element (Co/Me) is from 0.02 from 0.23, and the molar ratio of Mn to the transition metal element (Mn/Me) is from 0.62 to 0.72) (Patent Document 1).

(ii) A cathode active material represented by $zLi_2MnO_3 \cdot (1-z)LiNi_{u+\Delta}Mn_{u-\Delta}Co_wA_yO_2$ (wherein A is at least one element selected from Mg, Sr, Ba, Cd, Zn, Al, Ga, B, Zr, Ti, Ca, Ce, Y, Nb, Cr, Fe and V, z is from 0.03 to 0.47, $\Delta$ is from −0.3 to 0.3, 2u+w+y=1, w is from 0 to 1, u is from 0 to 0.5, and y<0.1) (Patent Document 2).

PRIOR ART DOCUMENTS

Patent Documents

Patent Document 1: WO2012/091015
Patent Document 2: WO2011/031546

SUMMARY OF INVENTION

Technical Problem

A lithium ion secondary battery containing the lithium rich cathode active material has problems such that the direct current resistance (hereinafter referred to as DCR) is high, and DCR tends to increase during use of the battery.

The object of the present invention is to provide a cathode active material with which a lithium ion secondary battery which has a high discharge capacity, of which initial DCR is not high, and of which an increase of DCR is suppressed even when a charge and discharge cycle is repeatedly carried out, can be obtained, a positive electrode for a lithium ion secondary battery comprising the cathode active material, and a lithium ion secondary battery which has a high discharge capacity, of which initial DCR is not high, and of which an increase of DCR is suppressed even when a charge and discharge cycle is repeatedly carried out.

Solution to Problem

The present inventors have found that initial DCR of a lithium ion secondary battery is not high, and an increase of DCR of a lithium ion secondary battery can be suppressed even when a charge and discharge cycle is repeatedly carried out, by a lithium rich cathode active material comprising secondary particles having a plurality of primary particles of a lithium-containing composite oxide agglomerated, wherein the secondary particles have relatively small voids in their interior and a total amount of the voids in the secondary particles is within a predetermined range.

That is, the present invention provides the following [1] to [5].

[1] A cathode active material comprising secondary particles having a plurality of primary particles of a lithium-containing composite oxide agglomerated,
wherein the lithium-containing composite oxide is represented by $Li_xNi_aCo_bMn_cM_dO_y$ (wherein x is from 1.1 to 1.7, a is from 0.15 to 0.5, b is from 0 to 0.33, c is from 0.33 to 0.85, M is a metal element other than Li, Ni, Co and Mn, d is from 0 to 0.05, a+b+c+d=1, and y is the number of moles of oxygen element (O) required to satisfy the valences of Li, Ni, Co, Mn and M),
in an X-ray diffraction pattern of the lithium-containing composite oxide, the ratio of the integrated intensity $I_{020}$ of a peak of (020) plane attributable to a crystal structure with space group C2/m to the integrated intensity $I_{003}$ of a peak of (003) plane attributable to a crystal structure with space group R−3m ($I_{020}/I_{003}$) is from 0.02 to 0.3,
the percentage of the total area $P_{total}$ of voids in a cross section of the secondary particles to the area S of the cross section (($P_{total}/S$)×100) is from 5 to 20%, and
the percentage of the area $P_{max}$ of the maximum void in a cross section of the secondary particles to the area S of the cross section (($P_{max}/S$)×100) is from 0.1 to 10%.

[2] The cathode active material according to [1], wherein $D_{50}$ of the cathode active material is from 3 to 15 μm.

[3] The cathode active material according to [1] or [2], wherein the specific surface area of the cathode active material is from 0.1 to 10 m²/g.

[4] A positive electrode for a lithium ion secondary battery, which comprises the cathode active material as defined in any one of [1] to [3], an electrically conductive material and a binder.

[5] A lithium ion secondary battery, which comprises the positive electrode for a lithium ion secondary battery as defined in [4], a negative electrode and a non-aqueous electrolyte.

Advantageous Effects of Invention

According to the cathode active material of the present invention, it is possible to obtain a lithium ion secondary battery which has a high discharge capacity, of which initial DCR is not high, and of which an increase of DCR is suppressed even when a charge and discharge cycle is repeatedly carried out.

According to the positive electrode for a lithium ion secondary battery of the present invention, it is possible to obtain a lithium ion secondary battery which has a high discharge capacity, of which initial DCR is not high, and of which an increase of DCR is suppressed even when a charge and discharge cycle is repeatedly carried out.

The lithium ion secondary battery of the present invention has a high discharge capacity, its initial DCR is not high, and an increase of its DCR is suppressed even when a charge and discharge cycle is repeatedly carried out.

DETAILED DESCRIPTION OF INVENTION

Figure 1:
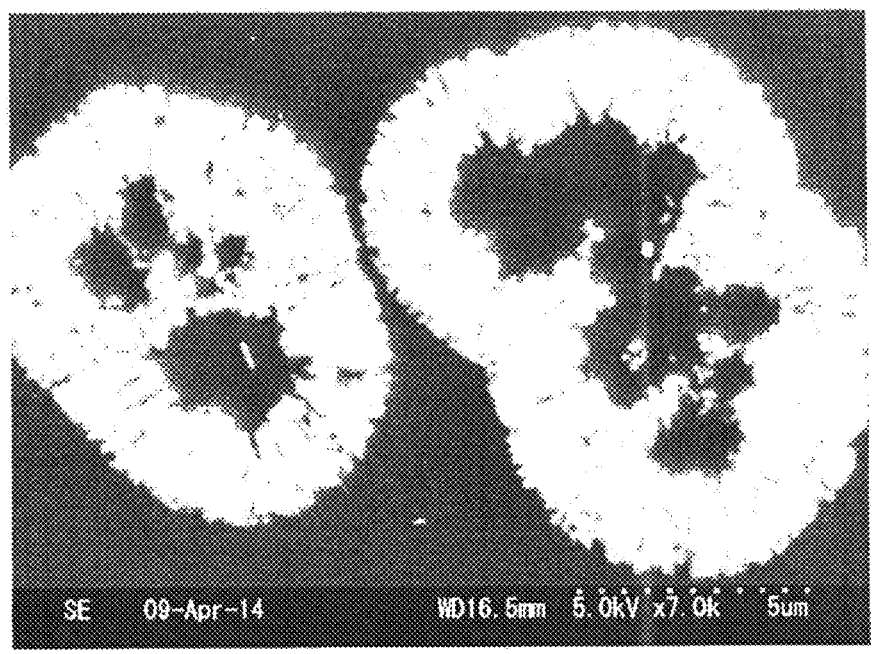
FIG. 1 is a scanning electron microphotograph of a cross section of the cathode active material in Ex. 6.

The following definitions of terms are applied to this specification and claims.

"Primary particles" mean minimum particles observed by a scanning electron microscope (SEM). Further, "secondary particles" mean other agglomerated particles.

"D50" is a volume-based particle size at a point of 50% on an accumulative volume distribution curve which is drawn by obtaining the particle size distribution on the volume basis and taking the whole to be 100%, that is, a volume-based accumulative 50% size. The particle size distribution is obtained from the frequency distribution and an accumulative volume distribution curve measured by means of a laser scattering particle size distribution measuring apparatus (for example, a laser diffraction/scattering type particle size distribution measuring apparatus). The measurement is carried out by sufficiently dispersing the powder in an aqueous medium by e.g. ultrasonic treatment.

"Specific surface area" is a value measured by a BET (Brunauer, Emmet, Teller) method. To measure the specific surface area, nitrogen is used as an adsorption gas.

The expression "Li" means a Li element, not a Li metal simple substance, unless otherwise specified. The same applies to expressions of the other elements such as Ni, Co and Mn.

Composition analysis of the lithium-containing composite oxide is carried out by inductively-coupled plasma spectrometry (hereinafter referred to as ICP). Further, the ratio of the elements of the lithium-containing composite oxide is a value with respect to the lithium-containing composite oxide before initial charging (also called activation treatment).

<Cathode Active Material>

The cathode active material of the present invention (hereinafter referred to as the present active material) comprises secondary particles having a plurality of primary particles of a compound represented by the following formula (hereinafter sometimes referred to as composite oxide I) agglomerated:

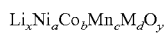

$$Li_xNi_aCo_bMn_cM_dO_y$$  Formula I x is the molar ratio of Li contained in the composite oxide I. x is from 1.1 to 1.7, preferably from 1.1 to 1.5, more preferably from 1.1 to 1.45. When x is at least the above lower limit, the discharge capacity of a lithium ion secondary battery comprising the present active material can be increased. When x is at most the above upper limit, the amount of free lithium on the surface of the composite oxide I can be reduced. If the amount of free lithium is large, the charge and discharge efficiency and the rate retention of the lithium ion secondary battery may be decreased, or decomposition of the electrolytic solution may be accelerated, thus leading to formation of a gas of the decomposed product.

a is the molar ratio of Ni contained in the composite oxide I. a is from 0.15 to 0.5, preferably from 0.15 to 0.45, more preferably from 0.2 to 0.4. When a is within the above range, the discharge capacity and the charge and discharge efficiency of the lithium ion secondary battery comprising the present active material can be made high.

b is the molar ratio of Co contained in the composite oxide I. b is from 0 to 0.33, preferably from 0 to 0.2, more preferably from 0 to 0.15. When b is within the above range, the discharge capacity and the charge and discharge efficiency of the lithium ion secondary battery comprising the present active material can be made high.

c is the molar ratio of Mn contained in the composite oxide I. c is from 0.33 to 0.85, preferably from 0.5 to 0.8, more preferably from 0.5 to 0.7. When c is within the above range, the discharge capacity and the charge and discharge efficiency of the lithium ion secondary battery comprising the present active material can be made high.

The composite oxide I may contain another metal element M as the case requires. Such another metal element M may, for example, be, Mg, Ca, Ba, Sr, Al, Cr, Fe, Ti, Zr, Y, Nb, Mo, Ta, W, Ce or La. It is preferably Mg, Al, Cr, Fe, Ti or Zr, whereby a high discharge capacity is likely to be obtained.

d is the molar ratio of M contained in the composite oxide I. d is from 0 to 0.05, preferably from 0 to 0.02, more preferably from 0 to 0.01.

The sum of a, b, c and d (a+b+c+d) is 1.

y is the number of moles of oxygen element (O) required to satisfy the valences of Li, Ni, Co, Mn and M.

The composite oxide I has a layered rock salt crystal structure with space group C2/m and a layered rock salt crystal structure with space group R–3m. The crystal structure with space group C2/m is also called lithium excess phase. A compound having a crystal structure with space group C2/m may, for example, be $Li(Li_{1/3}Mn_{2/3})O_2$. A compound having a crystal structure with space group R–3m may, for example, be $LiMeO_2$ (wherein Me is at least one element selected from Ni, Co and Mn). The composite oxide I having such a crystal structure may be confirmed by X-ray diffraction measurement.

In an X-ray diffraction pattern of the composite oxide I, the ratio of the integrated intensity $I_{020}$ of a peak of the (020) plane attributable to the crystal structure with space group C2/m to the integrated intensity $I_{003}$ of a peak of the (003) plane attributable to the crystal structure with space group R–3m ($I_{020}/I_{003}$) is from 0.02 to 0.3. When $I_{020}/I_{003}$ is within the above range, the composite oxide I has the above two crystal structures in a balanced manner, and thus the discharge capacity of the lithium ion secondary battery is likely to be made high. With a view to making the discharge capacity of the lithium ion secondary battery high, $I_{020}/I_{003}$ is more preferably from 0.02 to 0.28, further preferably from 0.02 to 0.25.

Further, the X-ray diffraction measurement may be carried out by the method disclosed in Examples. The peak of (003) plane of the crystal structure with space group R–3m is a peak which appears at 2θ=18 to 19°. The peak of (020) plane of the crystal structure with space group C2/m is a peak which appears at 2θ=20 to 21°.

The present active material comprises secondary particles having a plurality of primary particles of the composite oxide I agglomerated.

The percentage of the total area $P_{total}$ of voids in a cross section of the secondary particles to the area S of the cross section (($P_{total}/S) \times 100$) (hereinafter sometimes referred to as the porosity) is from 5 to 20%. When the porosity is at least 5%, initial DCR will not be high. Further, when the porosity is 20% or less, the secondary particles are less likely to be broken by pressing at the time of production of a positive electrode and as a result, an increase of DCR of the lithium ion secondary battery will be suppressed even when a charge and discharge cycle is repeatedly carried out. The lower limit of the porosity is preferably 7%, more preferably 10%. The upper limit of the porosity is preferably 17%, more preferably 16%.

The porosity in the cross section of the secondary particles is calculated as follows.

In a binarized image of a SEM image of the cross section of secondary particles (for example, a portion where primary particles are present is colored white and a void portion where no primary particles are present in the secondary particles and the outside of the secondary particles are colored black), using an image analysis software, the outside of the secondary particles and a portion connected to the outside in the void portion in the secondary particles are colored in a third color (a color other than white and black). The porosity (%) is determined in accordance with the following formula II, where $N_A$ is the total number of dots at the portion where the primary particles are present in the cross section of the secondary particles (white portion), and $N_B$ is the total number of dots at a portion not colored in the third color in the void portion of the cross section of the secondary particles i.e. the portion not connected to the outside in the void portion of the cross section of the secondary particles (black portion). In the SEM image, totally 20 secondary particles having a diameter in the particle cross section being $D_{50}$ of the cathode active material ±50% are selected and their porosities are obtained, and their average is taken as the porosity in the cross section of the secondary particles.

Porosity=$(N_B/(N_A+N_B)) \times 100$      Formula II

The percentage of the area $P_{max}$ of the maximum void in a cross section of the secondary particles to the area S of the cross section (($P_{max}/S) \times 100$) (hereinafter sometimes referred to as the percentage of the maximum void) is from 0.1 to 10%. When the percentage of the maximum void is at least 0.1%, initial DCR of the lithium ion secondary battery will not be high. When the percentage of the maximum void is at most 10%, the secondary particles are less likely to be broken by pressing at the time of production of a positive electrode and as a result, an increase of DCR of the lithium ion secondary battery will be suppressed even when a charge and discharge cycle is repeatedly carried out. The lower limit of the percentage of the maximum void is preferably 0.3%, more preferably 0.5%. The upper limit of the percentage of the maximum void is preferably 5%, more preferably 3%.

The percentage of the maximum void in the cross section of the secondary particles is calculated as follows.

In a binarized image of a SEM image of the cross section of secondary particles (for example, a portion where primary particles are present is colored white, and a void portion where no primary particles are present in the secondary particles and the outside of the secondary particles are colored black), using an image analysis software, the outside of the secondary particles and a portion connected to the outside in the void portion in the secondary particles are colored in a third color (for example green). Further, in a portion not colored in the third color in the void portion in the cross section of the secondary particles, i.e. a portion (black portion) not connected to the outside in the void portion in the cross section of the secondary particles, a portion with the largest area (with the highest number of connecting dots) is colored in a fourth color (for example red). The percentage (%) of the maximum void is determined in accordance with the following formula III, where $N_A$ is the total number of dots at the portion (white portion) where the primary particles are present in the cross section of the secondary particles, $N_B$ is the total number of dots at a portion not colored in the third color at the void portion in the cross section of the secondary particles, i.e. a portion (black portion and red portion) not connected to the outside in the void portion in the cross section of the secondary particles, and $N_C$ is the total number of dots at the portion (red portion) with the largest area (with the highest number of connecting dots) in the portion not connected to the outside in the void portion in the cross section of the secondary particles. In the SEM image, totally 20 secondary particles having a diameter in the particle cross section being $D_{50}$ of the cathode active material ±50% are selected and their percentages of the maximum void are obtained, and their average is taken as the percentage of the maximum void in the cross section of the secondary particles.

Percentage of maximum void=$(N_C/(N_A+N_B)) \times 100$      Formula III

In the present invention, the composite oxide I may be used alone as the present active material, or the composite oxide I having a covering on the surface may be used as the present active material. The present active material having a covering on the surface of the composite oxide I is preferred, whereby the cycle durability of the lithium ion secondary battery can be improved. It is considered that when the composite oxide I has a covering on the surface, the frequency of contact between the composite oxide I and the electrolytic solution is reduced, and as a result, elution of the transition metal element such as Mn contained in the composite oxide I to the electrolytic solution will be reduced.

The covering is preferably formed of an Al compound (such as $Al_2O_3$, AlOOH or $Al(OH)_3$) with a view to improving the cycle durability without lowering other battery characteristics of the lithium ion secondary battery.

The covering may be present on the entire surface of the composite oxide I or may be present on a part of the surface of the composite oxide I so long as it is present on the surface of the composite oxide I.

$D_{50}$ of the present active material is preferably from 3 to 15 μm, more preferably from 6 to 15 μm, particularly preferably from 6 to 12 μm. When $D_{50}$ of the present active material is within the above range, the discharge capacity of the lithium ion secondary battery can be made sufficiently high.

The specific surface area of the present active material is preferably from 0.1 to 10 m$^2$/g, more preferably from 0.5 to 7 m$^2$/g, particularly preferably from 0.5 to 5 m$^2$/g. When the specific surface area of the present active material is within the above range, both the discharge capacity and the cycle durability of the lithium ion secondary battery can be made sufficiently high.

(Process for Producing Cathode Active Material)

The present active material may be produced, for example, by a process comprising the following steps (a), (b), (c) and (d).

(a) A step of mixing a sulfate (A) essentially containing a sulfate of Ni and a sulfate of Mn and as the case requires, either one or both of a sulfate of Co and a sulfate of M, and at least one carbonate (B) selected from the group consisting of a carbonate of Na and a carbonate of K in an aqueous solution state and reacting them in the mixture to precipitate a carbonate compound (coprecipitate).

(b) A step of mixing the carbonate compound with a lithium compound and firing the mixture to obtain the composite oxide I.

(c) A step of washing the composite oxide I as the case requires.

(d) A step of forming a covering on the surface of the composite oxide I as the case requires.

In the step (a), the sulfate (A) and the carbonate (B) are mixed in an aqueous solution state and reacted in the mixture, whereby a carbonate compound containing Ni and Mn and as the case requires, either one or both of Co and M, is precipitated. In the step (a), another solution may be mixed as the case requires.

The sulfate (A) essentially contains a sulfate of Ni and a sulfate of Mn and as the case requires, may further contain either one or both of a sulfate of Co and a sulfate of M.

The sulfate of Ni may, for example, be nickel(II) sulfate hexahydrate, nickel(II) sulfate heptahydrate or nickel(II) ammonium sulfate hexahydrate.

The sulfate of Co may, for example, be cobalt(II) sulfate heptahydrate or cobalt(II) ammonium sulfate hexahydrate.

The sulfate of Mn may, for example, be manganese(II) sulfate pentahydrate or manganese(II) ammonium sulfate hexahydrate.

As the aqueous solution of the sulfate (A), separate aqueous solutions each containing one of the two or more types of the sulfates may be used, or one aqueous solution containing the two or more types of the sulfates may be used. Further, an aqueous solution containing one type of the sulfate and an aqueous solution containing two or more types of the sulfates may be used in combination. The same applies to a case where two types of the carbonates (B) are used.

The ratio of Ni, Co, Mn and M in the aqueous solution of the sulfate (A) is the same as the ratio of Ni, Co, Mn and M contained in the composite oxide I.

The total concentration of the metal element in the aqueous solution of the sulfate (A) is preferably from 0.1 to 3 mol/kg, more preferably from 0.5 to 2.5 mol/kg. When the total concentration of the metal element is at least the above lower limit, a high productivity will be achieved. When the total concentration of the metal element is at most the above upper limit, the sulfate (A) will sufficiently be dissolved in water.

The carbonate (B) is at least one carbonate selected from the group consisting of a carbonate of Na and a carbonate of K. The carbonate (B) also has a function as a pH adjusting agent to precipitate the carbonate compound.

The carbonate of Na may be sodium carbonate or sodium hydrogencarbonate.

The carbonate of K may be potassium carbonate or potassium hydrogencarbonate.

The carbonate (B) is preferably sodium carbonate or potassium carbonate in view of the low cost and with a view to controlling the particle size of the carbonate compound.

As the carbonate (B), one type may be used or two or more types may be used.

The total concentration of the carbonate in the aqueous solution of the carbonate (B) is preferably from 0.1 to 3 mol/kg, more preferably from 0.5 to 2.5 mol/kg. When the total concentration of the carbonate is within the above range, the carbonate compound is likely to be precipitated by coprecipitation reaction.

Another solution which may be mixed in the step (a) may, for example, be ammonia or an aqueous solution containing an ammonium salt. Such another solution has a function to adjust the pH or the solubility of the transition metal element. The ammonium salt may, for example, be ammonium chloride, ammonium sulfate or ammonium nitrate.

Ammonia or the ammonium salt is preferably supplied to the mixture simultaneously with supply of the sulfate (A).

The solvent for each of the aqueous solution of the sulfate (A), the aqueous solution of the carbonate (B) and another solution is preferably water. A solvent mixture containing an aqueous medium other than water in an amount up to 20% to the total mass of the solvent may be used as the solvent so long as the sulfate (A) and the carbonate (B) are dissolved.

The aqueous medium other than water may, for example, methanol, ethane, 1-propanol, 2-propanol, ethylene glycol, propylene glycol, diethylene glycol, dipropylene glycol, polyethylene glycol, butanediol or glycerin.

The way of mixing the sulfate (A) and the carbonate (B) in an aqueous solution state is not particularly limited so long as the sulfate (A) and the carbonate (B) are in a state of aqueous solutions when mixed.

Specifically, it is preferred to continuously add both the aqueous solution of the sulfate (A) and the aqueous solution of the carbonate (B) to the reactor, whereby the carbonate compound is likely to be precipitated and the particle size of the carbonate compound is easily controlled. To the reactor, deionized water, pure water, distilled water or the like is preferably preliminarily put. Further, it is more preferred to control the pH in the reactor with the carbonate (B) or another solution.

The sulfate (A) and the carbonate (B) are mixed in a state of aqueous solutions preferably with stirring in the reactor.

The stirring apparatus may, for example, be three-one motor. The stirring blade may, for example, be an anchor, propeller or paddle stirring blade.

The pH of the mixture when the sulfate (A) and the carbonate (B) are mixed is preferably kept at a value set within a range of from 7 to 12, more preferably from 7.5 to 10, whereby the carbonate compound is likely to be precipitated.

The temperature of the mixture when the sulfate (A) and the carbonate (B) are mixed is preferably from 20 to 80° C., more preferably from 25 to 60° C., whereby the carbonate compound is likely to be precipitated.

The sulfate (A) and the carbonate (B) are mixed preferably in a nitrogen atmosphere or in an argon atmosphere, with a view to suppressing oxidation of the precipitated carbonate compound, particularly preferably in a nitrogen atmosphere in view of the cost.

As the method of mixing the sulfate (A) and the carbonate (B) in an aqueous solution state to precipitate the carbonate compound, two methods i.e. a method of carrying out the precipitation reaction while the mixture in the reactor is withdrawn through a filter (e.g. filter cloth) to concentrate the carbonate compound (hereinafter referred to as concentration method) and a method of carrying out the precipitation reaction while the mixture in the reactor is withdrawn together with the carbonate compound without using a filter to maintain the concentration of the carbonate compound low (hereinafter referred to as overflow method) may be mentioned.

In the present invention, the overflow method is preferred. By using the carbonate compound obtained by the overflow method, secondary particles of the present active material finally obtainable are likely to satisfy the above porosity and percentage of the maximum void. The reason is considered to be as follows.

In the overflow method, since the precipitated carbonate compound is sequentially withdrawn from the reactor, the concentration of particles of the carbonate compound (solid content concentration) in the mixture in the reactor is maintained low. Thus, the primary particles of the carbonate compound are likely to be loosely agglomerated to form secondary particles of the carbonate compound having a high porosity, and on the other hand, the secondary particles of the carbonate compound are less likely to be agglomerated. When such secondary particles of the carbonate compound and a lithium compound are mixed and fired, Li of the lithium compound can infiltrate even into the interior of the carbonate compound. Thus, by firing, while carbonic acid is removed, the transition metal in the interior of the secondary particles of the carbonate compound and Li tend to react with each other to form a lithium-containing composite oxide. As a result, the secondary particles of the composite oxide I obtainable after firing are particles close to solid particles with a percentage of the maximum void being at most 10%.

On the other hand, in the overflow method, since the solid content concentration of the carbonate compound in the reactor is low, the rate of growth of each particle is high, and it may be difficult to control the particle size of the carbonate compound to the desired size in some cases. In such a case, it is effective to control the solid content concentration in the reactor not to be too low by applying a high shearing force to the particles of the carbonate compound in the reactor to control growth of the secondary particles and to allow the secondary nuclei to depart from the secondary particles so that the secondary nuclei further grow. As a method of applying a high shearing force, a method of using a dispersing machine such as a shaft generator, a homomixer, an ultrasonic homogenizer or a bead mill may be mentioned. The high shearing force may be applied directly to the mixture in the reactor, or the mixture in the reactor may be allowed to circulate in an external circulation line and a high shearing force is applied to the mixture in the external circulation line.

The ratio of Ni, Co, Mn and M contained in the carbonate compound is the same as the ratio of Ni, Co, Mn and M contained in the composite oxide I.

$D_{50}$ of the carbonate compound is preferably from 3 to 15 μm, more preferably from 6 to 15 μm, particularly preferably from 6 to 12 μm. When $D_{50}$ of the carbonate compound is within the above range, $D_{50}$ of the present active material is likely to be controlled within a preferred range.

The specific surface area of the carbonate compound is preferably from 50 to 300 m$^2$/g, more preferably from 100 to 250 m$^2$/g. When the specific surface area of the carbonate compound is within the above range, the specific surface area of the present active material is likely to be controlled in the above preferred range. The specific surface area of the carbonate compound is a value measured after the carbonate compound is dried at 120° C. for 15 hours.

The obtained carbonate compound is preferably separated from the mixture by filtration or centrifugal separation. For filtration or centrifugal separation, a pressure press, a vacuum filter, a centrifugal classifier, a filter press, a screw press or a rotary dehydrator may, for example, be used.

The obtained carbonate compound is preferably washed in order to remove impurity ions. As a washing method, for example, a method of repeating pressure filtration and dispersion in distilled water may be mentioned.

The carbonate compound is preferably dried after washing.

The drying temperature is preferably from 60 to 200° C., more preferably from 80 to 130° C. When the drying temperature is at least the lower limit, the carbonate compound may be dried in a short time. When the drying temperature is at most the upper limit, oxidation of the carbonate compound will be suppressed.

The drying time is preferably from 1 to 300 hours, more preferably from 5 to 120 hours.

In the step (b), the carbonate compound obtained in the step (a) and the lithium compound are mixed and fired, whereby the composite oxide I is obtained.

The ratio of Li, Ni, Co, Mn and M contained in the mixture of the carbonate compound and the lithium compound is the same as the ratio of Li, Ni, Co, Mn and M contained in the composite oxide I.

The lithium compound is preferably at least one member selected from the group consisting of lithium carbonate, lithium hydroxide and lithium nitrate, and from the viewpoint of handling efficiency, more preferably lithium carbonate.

As a method of mixing the carbonate compound and the lithium compound, for example, a method of using a rocking mixer, a nauta mixer, a spiral mixer, a cutter mill or a V mixer may be mentioned.

The firing apparatus may, for example, be an electric furnace, a continuous firing furnace or a rotary kiln.

Firing is preferably carried out in the air, particularly preferably while supplying the air, whereby the carbonate compound is oxidized during firing.

The rate of supply of the air is preferably from 10 to 200 mL/min, more preferably from 40 to 150 mL/min per 1 L of the internal capacity of the furnace.

By supplying the air during firing, the transition metal element in the carbonate compound is sufficiently oxidized, whereby the present active material containing the composite oxide I having high crystallinity and having a desired crystal phase will be obtained.

Firing may be carried out by one-step firing or may be carried out by two-step firing comprising temporary firing and then main firing. Firing is preferably carried out by the two-step firing, whereby Li is likely to be uniformly dispersed in the composite oxide I.

In the case of the one-step firing, the firing temperature is from 500 to 1,000° C., preferably from 600 to 1,000° C., particularly preferably from 800 to 950° C.

In the case of the two-step firing, the temperature for temporary firing is preferably from 400 to 700° C., more preferably from 500 to 650° C.

In the case of the two-step firing, the temperature for main firing is preferably from 700 to 1,000° C., more preferably from 800 to 950° C.

When the firing temperature is within the above range, a composite oxide I having high crystallinity will be obtained.

The firing time is preferably from 4 to 40 hours, more preferably from 4 to 20 hours.

When the firing time is within the above range, a composite oxide I having high crystallinity will be obtained.

The process for producing the composite oxide I contained in the present active material is not limited to the above process.

For example, a step of mixing the carbonate compound obtained in the step (a) with a phosphate aqueous solution (such as a phosphate aqueous solution, an ammonium dihydrogen phosphate aqueous solution or a diammonium hydrogen phosphate aqueous solution) and volatilizing the moisture may be carried out. By this step, the primary particles of the present active material may be doped with P.

The composite oxide I may be washed with water, for example, for the purpose of removing the impurities such as Na.

As a washing method, for example, a method of mixing the composite oxide I with water, followed by stirring may be mentioned. The stirring time is preferably from 0.5 to 72 hours.

After the composite oxide I is washed, it is preferred to separate the composite oxide I and water by filtration and dry the composite oxide I. The drying temperature is preferably from 50 to 110° C. The drying time is preferably from 1 to 24 hours.

The composite oxide I after drying may further be fired. The firing temperature is preferably from 200 to 600° C. The firing time is preferably from 0.5 to 12 hours.

As a method of forming a covering on the surface of the composite oxide I, a powder mixing method, a gas phase method, a spray coating method or a dipping method may, for example, be mentioned. Hereinafter, the method will be described with respect to a case where the covering is an Al compound.

The powder mixing method is a method of mixing the composite oxide I and the Al compound, followed by heating. The gas phase method is a method of vaporizing an organic compound containing Al such as aluminum ethoxide, aluminum isopropoxide or aluminum acetylacetonate, and bringing the vapor of the organic compound into contact with the surface of the composite oxide I to allow them to react with each other. The spray coating method is a method of spraying a solution containing Al to the composite oxide I, followed by heating.

Otherwise, an Al water soluble compound (such as aluminum acetate, aluminum oxalate, aluminum citrate, aluminum lactate, basic aluminum lactate or aluminum nitrate) to form the Al compound is dissolved in a solvent, and the resulting aqueous solution is brought into contact with the composite oxide I, followed by heating to remove the solvent, thereby to form a covering containing the Al compound on the surface of the composite oxide I.

(Function and Mechanism)

Since the above-described present active material is a lithium rich cathode active material, a lithium ion secondary battery having a high discharge capacity will be obtained with the present active material.

Further, the above-described present active material has a porosity in the cross section of the secondary particles of at least 5% and a percentage of the maximum void in the cross section of the secondary particles of at least 0.1%, initial DCR of a lithium ion secondary battery obtained by using the present active material will not be high.

Further, since the above-described present active material has a porosity in the cross section of the secondary particles of at most 20% and a percentage of the maximum void in the cross section of the secondary particles of at most 10%, an increase of DCR of a lithium ion secondary battery obtained by using the present active material will be suppressed even when a charge and discharge cycle is repeatedly carried out.

<Positive Electrode for Lithium Ion Secondary Battery>

The positive electrode for a lithium ion secondary battery of the present invention (hereinafter sometimes referred to as the present positive electrode) comprises the present active material. Specifically, it comprises a cathode active material layer containing the present active material, an electrically conductive material and a binder formed on a positive electrode current collector.

As the electrically conductive material, carbon black (such as acetylene black or Ketjen black), graphite, vapor-grown carbon fibers or carbon nanotubes may, for example, be mentioned.

As the binder, a fluorinated resin (such as polyvinylidene fluoride or polytetrafluoroethylene), a polyolefin (such as polyethylene or polypropylene), a polymer or copolymer having unsaturated bonds (such as a styrene/butadiene rubber, an isoprene rubber or a butadiene rubber) or an acrylic polymer or copolymer (such as an acrylic copolymer or a methacrylic copolymer) may, for example, be mentioned.

As the positive electrode current collector, an aluminum foil or a stainless steel foil may, for example, be mentioned.

(Method for Producing Positive Electrode)

The present positive electrode may be produced, for example, by the following method.

The present active material, the electrically conductive material and the binder are dissolved or dispersed in a medium to obtain a slurry. The obtained slurry is applied to the positive electrode current collector, and the medium is removed e.g. by drying to form a layer of the cathode active material. As the case requires, the layer of the cathode active material may be pressed e.g. by roll pressing. The positive electrode for a lithium ion secondary battery is obtained in such a manner.

Otherwise, the present active material, the electrically conductive material and the binder are kneaded with a medium to obtain a kneaded product. The obtained kneaded product is pressed on the positive electrode current collector to obtain the positive electrode for a lithium ion secondary battery.

(Function and Mechanism)

Since the above-described present positive electrode contains the present active material, with the present positive electrode, it is possible to obtain a lithium ion secondary battery which has a high discharge capacity, of which initial DCR is not high, and of which an increase of DCR is suppressed even when a charge and discharge cycle is repeatedly carried out.

<Lithium Ion Secondary Battery>

The lithium ion secondary battery of the present invention (hereinafter sometimes referred to as the present battery) comprises the present positive electrode. Specifically, is comprises the present positive electrode, a negative electrode and a non-aqueous electrolyte.

The negative electrode contains an anode active material. Specifically, it comprises an anode active material layer containing an anode active material and as the case requires an electrically conductive material and a binder, formed on a negative electrode current collector.

The anode active material may be any material so long as it is capable of absorbing and desorbing lithium ions at a relatively low potential. The anode active material may, for example, be a lithium metal, a lithium alloy, a lithium compound, a carbon material, an oxide composed mainly of a metal in Group 14 of the periodic table, an oxide composed mainly of a metal in Group 15 of the periodic table, a carbon compound, a silicon carbide compound, a silicon oxide compound, titanium sulfide or a boron carbide compound.

The carbon material as the anode active material may, for example, be non-graphitized carbon, artificial graphite, natural graphite, thermally decomposed carbon, cokes (such as pitch coke, needle coke or petroleum coke), graphites, glassy carbons, an organic polymer compound fired product (product obtained by firing and carbonizing a phenol resin, a furan resin or the like at an appropriate temperature), carbon fibers, activated carbon or carbon blacks.

The metal in Group 14 of the periodic table to be used as the anode active material may be Si or Sn, and is preferably Si.

As another anode active material, an oxide such as iron oxide, ruthenium oxide, molybdenum oxide, tungsten oxide, titanium oxide or tin oxide, or a nitride may, for example, be mentioned.

As the electrically conductive material and the binder for the negative electrode, the same ones as for the positive electrode may be used.

As the negative electrode current collector, a metal foil such as a nickel foil or a copper foil may be mentioned.

(Method for Producing Negative Electrode)

The negative electrode may be produced, for example, by the following method.

The anode active material, the electrically conductive material and the binder and dissolved or dispersed in a medium to obtain a slurry. The obtained slurry is applied to the negative electrode current collector, and the medium is removed e.g. by drying, followed by pressing to obtain the negative electrode.

The non-aqueous electrolyte may, for example, be a non-aqueous electrolytic solution having an electrolyte salt dissolved in an organic solvent; an inorganic solid electrolyte; or a solid or gelled polymer electrolyte in which an electrolyte salt is mixed with or dissolved in e.g. a polymer compound.

The organic solvent may be an organic solvent known for a non-aqueous electrolytic solution. It may, for example, be specifically propylene carbonate, ethylene carbonate, diethyl carbonate, dimethyl carbonate, 1,2-dimethoxyethane, 1,2-diethoxyethane, γ-butyrolactone, diethyl ether, sulfolane, methyl sulfolane, acetonitrile, an acetic acid ester, a butyric acid ester or a propionic acid ester. In view of the voltage stability, preferred is a cyclic carbonate (such as propylene carbonate) or a chain-structured carbonate (such as dimethyl carbonate or diethyl carbonate). Such organic solvents may be used alone or in combination of two or more.

As the inorganic solid electrolyte, a material having lithium ion conductivity may be used.

The inorganic solid electrolyte may, for example, be lithium nitride or lithium iodide.

As the polymer to be used for the solid polymer electrolyte, an ether polymer compound (such as polyethylene oxide or its crosslinked product), a polymethacrylate ester polymer compound or an acrylate polymer compound may, for example, be mentioned. Such polymer compounds may be used alone or in combination of two or more.

As the polymer to be used for the gelled polymer electrolyte, a fluorinated polymer compound (such as polyvinylidene fluoride or a vinylidene fluoride/hexafluoropropylene copolymer), polyacrylonitrile, an acrylonitrile copolymer or an ether polymer compound (such as polyethylene oxide or its crosslinked product) may, for example, be mentioned. As a monomer to be copolymerized to obtain the copolymer, polypropylene oxide, methyl methacrylate, butyl methacrylate, methyl acrylate or butyl acrylate may, for example, be mentioned.

The polymer compound is preferably a fluorinated polymer compound in view of the stability against the redox reaction.

As the electrolyte salt, any one of those commonly used for a lithium ion secondary battery may be used. The electrolyte salt may, for example, be $LiClO_4$, $LiPF_6$, $LiBF_4$ or $CH_3SO_3Li$.

Between the positive electrode and the negative electrode, a separator may be interposed so as to prevent short-circuiting. As the separator, a porous film may be mentioned. The porous film is used as impregnated with the non-aqueous electrolytic solution. Further, the porous film impregnated with the non-aqueous electrolytic solution, followed by gelation, may be used as a gelled electrolyte.

As a material of a battery exterior package, nickel-plated iron, stainless steel, aluminum or its alloy, nickel, titanium, a resin material or a film material may, for example, be mentioned.

The shape of the lithium ion secondary battery may, for example, be a coin-shape, a sheet-form (film-form), a folded shape, a wound cylinder with bottom, or a button shape, and is suitably selected depending upon the intended use.

(Function and Mechanism)

The above-described present battery has a high discharge capacity, its initial DCR is not high, and an increase of its DCR is suppressed even when a charge and discharge cycle is repeatedly carried out.

EXAMPLES

Now, the present invention will be described in further detail with reference to Examples. In the following Examples, Ex. 1, 2, 4 and 6 are Comparative Examples, and Ex. 3, 5, 7 and 8 are Examples of the present invention.

(Particle Size)

The carbonate compound or the cathode active material was sufficiently dispersed in water by ultrasonic treatment, and measured by a laser diffraction/scattering type particle size distribution measuring apparatus (MT-3300EX manufactured by NIKKISO CO., LTD.), and the frequency distribution and an accumulative volume distribution curve were obtained, whereby the volume-based particle size distribution was obtained. The particle size at a point of 50% on the obtained accumulative volume distribution curve was taken as $D_{50}$.

(Specific Surface Area)

The specific surface area of each of the carbonate compound and the cathode active material was measured by a nitrogen adsorption BET method using a specific surface area measuring apparatus (apparatus name: HM model-1208, manufactured by Mountech Co., Ltd.). Deaeration was carried out at 200° C. for 20 minutes.

(Cross Section SEM)

The cathode active material (lithium-containing composite oxide) embedded in an epoxy resin was polished with diamond abrasive grains, and the cross section of the secondary particles was observed by a SEM. Secondary particles having a large void formed in the interior were evaluated as "hollow" and secondary particles having no large void formed in the interior although having small voids present were evaluated as "solid".

(Porosity)

The image of the obtained cross section by SEM was binarized by an image analysis software. In the binarized image, a portion outside the secondary particles and a portion connected to the outside in a void portion in the secondary particles were colored in a third color (green). The porosity (%) was obtained in accordance with the following formula II, where $N_A$ is the total number of dots at a portion where primary particles are present in the cross section of the secondary particles (white portion), and $N_B$ is the total number of dots at a portion not colored in the third color in the void portion in the cross section of the secondary particles, i.e. a portion not connected to the outside in the void portion in the cross section of the secondary particles (black portion). The porosities of totally 20 secondary particles were obtained, and their average was taken as the porosity in the cross section of the secondary particles.

$$\text{Porosity} = (N_B/(N_A+N_B)) \times 100 \quad \text{Formula II}$$

(Percentage of Maximum Void)

In the image used to determine the porosity, in the portion not connected to the outside in the void portion in the cross section of the secondary particles (black portion), a portion with the largest area (with a highest number of connecting dots) was colored in a fourth color (red). The percentage (%) of the maximum void was obtained in accordance with the following formula III, where $N_A$ is the total number of dots at a portion where the primary particles are present in the cross section of the secondary particles (white portion), $N_B$ is the total number of dots at a portion not colored in the third color in the void portion in the cross section of the secondary particles, i.e. a portion not connected to the outside in the void portion in the cross section of the secondary particles (black portion and red portion), and $N_C$ is the total number of dots at the portion with the largest area (with the highest number of connecting dots) (red portion) in the portion not connected to the outside in the void portion in the cross section of the secondary particles. The percentages of the maximum void of totally 20 secondary particles were obtained, and their average was taken as the percentage of the maximum void in the cross section of the secondary particles.

$$\text{Percentage of maximum void} = (N_C/(N_A+N_B)) \times 100 \quad \text{Formula III}$$

(Composition Analysis)

Composition analysis of the lithium-containing composite oxide as the cathode active material was carried out by a plasma emission spectroscope (SPS3100H manufactured by SII NanoTechnology Inc.).

(X-Ray Diffraction)

The X-ray diffraction measurement of the lithium-containing composite oxide as the cathode active material was carried out by an X-ray diffraction apparatus (manufactured by Rigaku Corporation, apparatus name: SmartLab). The measurement conditions are shown in Table 1. The measurement was carried out at 25° C. With respect to the X-ray diffraction pattern, peak search was carried out using integrated X-ray powder diffraction softwater PDXL2 manufactured by Rigaku Corporation, and the integrated intensity $I_{020}$ of a peak of (020) plane attributable to a crystal structure with space group C2/m and the integrated intensity $I_{003}$ of a peak of (003) plane attributable to a crystal structure with space group R-3m were obtained, and the ratio ($I_{020}/I_{003}$) was calculated.

TABLE 1

| Apparatus condition | Measurement apparatus | SmartLab manufactured by Rigaku Corporation |
|---|---|---|
| | Target | Cu |
| | Detector | D/teX Ultra HE manufactured by Rigaku Corporation |
| | Detector baseline | 44 div |
| | Detector window | 8 div |
| | Gonio length | 300 mm |
| | Soller/PSC | 5.0 (deg.) |
| | IS long dimension | 10 (mm) |
| | PSA | Open |
| | Soller | 5.0 (deg.) |
| | Monochromatization method | Kβ filter method |
| Sample condition | Sample holder | Diameter: 24 mm, depth: 0.5 mm |
| | Rotation of sample during measurement | Rotated (30 rpm) |

TABLE 1-continued

| Measurement condition | Measurement method | General purpose measurement (focal method) |
|---|---|---|
| | Scanning axis | 2θ/θ |
| | Mode | Continuous |
| | Range specification | Absolute |
| | Initiation (deg.) | 10 (deg.) |
| | Termination (deg.) | 90 (deg.) |
| | Step (deg.) | 0.01 (deg.) |
| | Speed measurement time | 10 (deg./min.) |
| | IS (deg.) | 1/3 (deg.) |
| | RS1 (mm) | 8 (mm) |
| | RS2 (mm) | 13 (mm) |
| | Attenuator | Open |
| | Tube voltage (kV) | 45 (kV) |
| | Tube current (mA) | 200 (mA) |
| Data processing condition | Analysis software | PDXL2 manufactured by Rigaku Corporation |
| | Smoothing | Smoothing by B-Spline, $x$ threshold: 1.50 |
| | Background removal | Fitting |
| | Kα2 removal | Intensity ratio: 0.4970 |
| | Peak search | Secondary differentiation σ cut: 3.00 |
| | Profile fitting | Fitting of measurement data |
| | Peak shape | Variance pseudo-voigt function |

(Production of Positive Electrode)

The cathode active material, acetylene black and a solution containing 12.0 mass % of polyvinylidene fluoride (solvent: N-methylpyrrolidone) were mixed, and N-methylpyrrolidone was further added to prepare a slurry. The mass ratio of the lithium-containing composite oxide, acetylene black and polyvinylidene fluoride was 90:5:5 in Ex. 1, and 80:10:10 in the other Ex.

The slurry was applied on one side of an aluminum foil (positive electrode current collector) having a thickness of 20 μm by means of a doctor blade. The gap at the time of application was adjusted so that the thickness of the positive electrode sheet after roll pressing would be 30 μm. After drying at 120° C., roll pressing was carried out twice to prepare a positive electrode sheet. A circle having a diameter of 18 mm was punched out from the obtained positive electrode sheet to prepare a positive electrode.

(Production of Lithium Secondary Battery)

As a negative electrode, a negative electrode comprising a metal lithium foil having a thickness of 500 μm as the anode active material layer and a stainless steel plate having a thickness of 1 mm as the negative electrode current collector was prepared.

As the separator, a porous polypropylene having a thickness of 25 μm was prepared.

As a non-aqueous electrolytic solution, a $LiPF_6$ solution at a concentration of 1 mol/dm$^3$ was prepared. As the solvent of the non-aqueous electrolytic solution, a solvent mixture of ethylene carbonate and diethyl carbonate (volume ratio of 3:7) was used.

Using the above positive electrode, negative electrode, separator and non-aqueous electrolytic solution, a stainless steel simple sealed cell type lithium secondary battery was assembled in an argon globe box.

(Charge Capacity and Discharge Capacity in Ex. 1 to 3)

The lithium secondary battery was charged to 4.6 V with a load current of 20 mA per 1 g of the cathode active material at a constant current and then discharged at a constant voltage of 4.6 V. The charge at a constant voltage was carried out until the load current was 1.3 mA/g per 1 g of the cathode active material. The battery was discharged to 2.0 V with a load current of 20 mA per 1 g of the cathode active material. In such a manner, initial charge and discharge was carried out. The charge capacity and the discharge capacity in the initial charge and discharge were measured.

(Charge Capacity and Discharge Capacity in Ex. 4 to 8)

A cycle of charging the lithium secondary battery to 4.6 V with a load current of 40 mA per 1 g of the cathode active material at a constant current and discharging it to 2.0 V with a load current of 200 mA per 1 g of the cathode active material, was repeated twice. Then, the battery was charged to 4.7 V with a load current of 20 mA per 1 g of the cathode active material at a constant current and discharged at a constant voltage of 4.7 V until the load current per 1 g of the cathode active material was 1.3 mA/g. The battery was discharged to 2.0 V with a load current of 20 mA per 1 g of the cathode active material. In such a manner, initial charge and discharge was carried out. The sum of the irreversible capacities of the first and second charge and discharge and the third discharge capacity was taken as the initial charge capacity, and the third discharge capacity was taken as the initial discharge capacity.

(DCR)

After the initial charge and discharge, the lithium secondary battery was charge at a constant current and a constant voltage of 3.75 V for three and a half hours, and then discharged with a load current of 60 mA per 1 g of the cathode active material for one minute. The voltage drop 10 seconds after initiation of discharge was divided by the current value to calculate the initial DCR1 value.

(DCR after Charge and Discharge Cycle)

DCR2 after the charge and discharge cycle was measured, after the charge and discharge cycle was repeated 50 times, in the same manner as the measurement of the initial DCR.

The DCR increase was obtained in accordance with the following formula IV from the initial DCR1 and the DCR2 after the charge and discharge cycle.

DCR increase=((DCR2−DCR1)/DCR1)×100    formula IV

Ex. 1

Step (a):

Nickel(II) sulfate hexahydrate and manganese(II) sulfate pentahydrate were dissolved in distilled water so that the molar ratio of Ni and Mn would be as shown in Table 2 and that the total concentration of Ni and Mn would be 1.5 mol/kg to prepare an aqueous sulfate solution.

Sodium carbonate was dissolved in distilled water to prepare a 1.5 mol/kg aqueous carbonate solution (pH adjusting solution).

Into a 2 L baffle-equipped glass reactor, distilled water was put and heated to 30° C. by a mantle heater, and the aqueous sulfate solution was added at a rate of 5.0 g/min for 17 hours with stirring by a two-stage tilt paddle type stirring blade. During addition of the aqueous sulfate solution, the pH adjusting solution was added so as to keep the pH in the reactor to be 8, to precipitate a carbonate compound (coprecipitate) containing Ni and Mn. The initial pH of the mixture was 8. During the precipitation reaction, a nitrogen gas was made to flow at a rate of 2 L/min in the reactor so that the precipitated carbonate compound would not be oxidized. Further, as the precipitation method, the concentration method was employed, that is, during the reaction, a liquid containing no carbonate compound was continuously withdrawn using filter cloth so that the liquid amount in the reactor would not exceed 2 L. In order to remove impurity ions from the obtained carbonate compound, pressure filtration and dispersion in distilled water were repeated to wash the carbonate compound. Washing was completed at a point where the electrical conductivity of the filtrate became less than 20 mS/m, and the carbonate compound was dried at 120° C. for 15 hours.

Step (b):

The dried carbonate compound and lithium carbonate were mixed so that the molar ratio of Li and Me (Me is Ni and Mn) (Li/Me) would be as shown in Table 2.

In the air atmosphere, the mixture was subjected to temporary firing at 600° C. for 5 hours and then to main firing at 915° C. for 16 hours to obtain a lithium-containing composite oxide. This lithium-containing composite oxide was used as a cathode active material.

The conditions for production of the lithium-containing composite oxide, the physical properties of the carbonate compound, the physical properties of the cathode active material (lithium-containing composite oxide) and the results of evaluation of the lithium secondary battery are shown in Tables 2 and 3.

Ex. 2

Steps (a) and (b):

A lithium-containing composite oxide was obtained in the same manner as in Ex. 1 except that the production conditions were changed as identified in Table 2.

Step (c):

The obtained lithium-containing composite oxide was put in a polypropylene container with a cover, and distilled water in an amount of 5 times the mass of the lithium-containing composite oxide was added. Using a mixing rotor, the content in the reactor was stirred at 15 rpm for one hour. The lithium-containing composite oxide was separated from distilled water by suction filtration and washed by pouring distilled water in an amount of 5 times the mass of the lithium-containing composite oxide. The lithium-containing composite oxide was dried in a constant temperature chamber at 100° C. for 2 hours and further fired at 450° C. for 5 hours. The washed and dried lithium-containing composite oxide was used as a cathode active material.

The conditions for production of the lithium-containing composite oxide, the physical properties of the carbonate compound, the physical properties of the cathode active material (lithium-containing composite oxide) and the results of evaluation of the lithium secondary battery are shown in Tables 2 and 3.

Ex. 3

Step (a):

The same aqueous sulfate solution and pH adjusting solution as in Ex. 1 were prepared.

Into a 2 L baffle-equipped glass reactor, distilled water was put and heated to 60° C. by a mantle heater, and the aqueous sulfate solution was added at a rate of 5.0 g/min. Further, into the reactor, a homogenizer (ULTRA-TURRAX T50 digital manufactured by IKA) was inserted, and a shearing force was applied to the mixture at 6,600 rpm. During addition of the aqueous sulfate solution, the pH adjusting solution was added so as to keep the pH in the reactor to be 8, to precipitate a carbonate compound (coprecipitate) containing Ni and Mn. The initial pH of the mixture was 7. During the precipitation reaction, a nitrogen gas was made to flow at a rate of 2 L/min in the reactor so that the precipitated carbonate compound would not be oxidized. Further, as the precipitation method, the overflow method was employed, that is, during the reaction, the mixture was withdrawn from an overflow port so that the liquid amount in the reactor would not exceed 2 L. The overflowing carbonate compound over a period of from 13 to 19 hours after initiation of the reaction was recovered. In order to remove impurity ions from the obtained carbonate compound, pressure filtration and dispersion in distilled water were repeated to wash the carbonate compound. Washing was completed at a point where the electrical conductivity of the filtrate became less than 20 mS/m, and the carbonate compound was dried at 120° C. for 15 hours.

Step (b):

In the same manner as in Ex. 1 except that the firing conditions were changed as identified in Table 2, the mixture was fired to obtain a lithium-containing composite oxide.

Step (c):

In the same manner as in Ex. 2, the lithium-containing composite oxide was washed and dried. The washed and dried lithium-containing composite oxide was used as a cathode active material.

The conditions for production of the lithium-containing composite oxide, the physical properties of the carbonate compound, the physical properties of the cathode active material (lithium-containing composite oxide) and the results of evaluation of the lithium secondary battery are shown in Tables 2 and 3.

By comparison between the cathode active materials in Ex. 1 and 2 and the cathode active material in Ex. 3 which have substantially the same composition of the lithium-containing composite oxide, the cathode active material in Ex. 3 has a porosity and a percentage of the maximum void in the cross section of the secondary particles being lower than those of the cathode active materials in Ex. 1 and 2. Thus, in Ex. 3, an increase of DCR of the lithium ion secondary battery is suppressed even when a charge and discharge cycle is repeatedly carried out.

Ex. 4

Steps (a) to (c):

A lithium-containing composite oxide was obtained in the same manner as in Ex. 2 except that the molar ratio of the sulfate and the production conditions were changed as identified in Table 4.

The conditions for production of the lithium-containing composite oxide, the physical properties of the carbonate compound, the physical properties of the cathode active material (lithium-containing composite oxide) and the results of evaluation of the lithium secondary battery are shown in Tables 4 and 5.

TABLE 2

| | Step (a) | | | | | | | | | Carbonate compound | |
|---|---|---|---|---|---|---|---|---|---|---|---|
| | Charge [mol %] | | | Precipitation | Shearing condition | Initial | Controlled | Time | Temperature | $D_{50}$ | Specific surface area |
| Ex. | Ni | Co | Mn | method | [rpm] | pH | pH | [Hr] | [° C.] | [μm] | [m$^2$/g] |
| 1 | 30.00 | 0 | 70.00 | Concentration method | — | 8 | 8 | 17 | 30 | 6.8 | 147.5 |
| 2 | 30.00 | 0 | 70.00 | Concentration method | — | 8 | 8 | 17 | 30 | 6.8 | 132.4 |
| 3 | 30.00 | 0 | 70.00 | OF method | 6600 | 7 | 8 | 13-19 | 60 | 6.9 | 117.4 |

| | Step (b) | | | | | | | |
|---|---|---|---|---|---|---|---|---|
| | Charge | Temporary firing | | | Main firing | | | |
| Ex. | Li/Me | Temperature [° C.] | Time [Hr] | Atmosphere | Temperature [° C.] | Time [Hr] | Atmosphere | Step (c) |
| 1 | 1.400 | 600 | 5 | Air | 915 | 16 | Air | Nil |
| 2 | 1.400 | 600 | 5 | Air | 890 | 16 | Air | Conducted |
| 3 | 1.400 | 600 | 5 | Air | 935 | 16 | Air | Conducted |

OF method: overflow method

TABLE 3

| | Cathode active material (lithium-containing composite oxide) | | | | | | | | | | Evaluation | | | | |
|---|---|---|---|---|---|---|---|---|---|---|---|---|---|---|---|
| | $D_{50}$ | Specific surface area | Cross section | Porosity | Percentage of maximum | Analytical composition | | | | | Initial DCR | DCR after cycle | DCR increase | Charge capacity | Discharge capacity |
| Ex. | [μm] | [m$^2$/g] | SEM | [%] | void [%] | x | a | b | c | $I_{020}/I_{003}$ | [Ω] | [Ω] | [%] | [mAh/g] | [mAh/g] |
| 1 | 5.6 | 1.99 | Hollow | 21.89 | 19.03 | 1.4 | 0.2981 | 0 | 0.7019 | 0.13 | 34.4 | 82.6 | 140 | 318.5 | 261.8 |
| 2 | 6.1 | 3.18 | Hollow | 22.06 | 17.72 | 1.4 | 0.2998 | 0 | 0.7002 | 0.12 | 23.1 | 59.7 | 159 | 315.2 | 283.7 |
| 3 | 7.0 | 4.28 | Solid | 10.17 | 0.510 | 1.4 | 0.3071 | 0 | 0.6929 | 0.11 | 28.6 | 50.1 | 75 | 305.6 | 267.1 |

Ex. 5

Steps (a) to (c):

A lithium-containing composite oxide was obtained in the same manner as in Ex. 3 except that the molar ratio of the sulfate and the production conditions were changed as identified in Table 4.

The conditions for production of the lithium-containing composite oxide, the physical properties of the carbonate compound, the physical properties of the cathode active material (lithium-containing composite oxide) and the results of evaluation of the lithium secondary battery are shown in Tables 4 and 5.

TABLE 4

| | | | | Step (a) | | | | | | | |
|---|---|---|---|---|---|---|---|---|---|---|---|
| | | | | | | | | | | | Carbonate compound | |
| | Charge [mol %] | | | Precipitation | Shearing condition | Initial | Controlled | Time | Temperature | $D_{50}$ | Specific surface area |
| Ex. | Ni | Co | Mn | method | [rpm] | pH | pH | [Hr] | [° C.] | [μm] | [m$^2$/g] |
| 4 | 25.00 | 0 | 75.00 | Concentration method | — | 7 | 8 | 35 | 30 | 6.3 | 99.0 |
| 5 | 25.00 | 0 | 75.00 | OF method | 5600 | 7 | 8 | 78-94 | 40 | 8.1 | 132.1 |

| | | Step (b) | | | | | |
|---|---|---|---|---|---|---|---|
| | Charge | Temporary firing | | Main firing | | | |
| Ex. | Li/Me | Temperature [° C.] | Time [Hr] | Atmosphere | Temperature [° C.] | Time [Hr] | Atmosphere | Step (c) |
| 4 | 1.500 | 600 | 5 | Air | 865 | 16 | Air | Conducted |
| 5 | 1.500 | 600 | 5 | Air | 900 | 16 | Air | Conducted |

OF method: overflow method

TABLE 5

| | Cathode active material (lithium-containing composite oxide) | | | | | | | | | Evaluation | | | | |
|---|---|---|---|---|---|---|---|---|---|---|---|---|---|---|
| | $D_{50}$ | Specific surface area | Cross section SEM | Porosity | Percentage of maximum void | Analytical composition | | | | $I_{020}/I_{003}$ | Initial DCR | DCR after cycle | DCR increase | Charge capacity | Discharge capacity |
| Ex. | [μm] | [m$^2$/g] | | [%] | [%] | x | a | b | c | | [Ω] | [Ω] | [%] | [mAh/g] | [mAh/g] |
| 4 | 6.0 | 3.08 | Hollow | 17.86 | 13.04 | 1.5 | 0.2475 | 0 | 0.7525 | 0.15 | 20.9 | 72.3 | 245 | 341.5 | 267.0 |
| 5 | 7.5 | 3.68 | Solid | 12.92 | 1.980 | 1.5 | 0.2511 | 0 | 0.7489 | 0.11 | 30.9 | 61.0 | 97 | 335.9 | 298.9 |

By comparison between the cathode active material in Ex. 4 and the cathode active material in Ex. 5 which have substantially the same composition of the lithium-containing composite oxide, the cathode active material in Ex. 5 has a porosity and a percentage of the maximum void in the cross section of the secondary particles being lower than those of the cathode active material in Ex. 4. Thus, in Ex. 5, an increase of DCR of the lithium ion secondary battery is suppressed even when a charge and discharge cycle is repeatedly carried out.

Ex. 6

Step (a):

Nickel(II) sulfate hexahydrate, cobalt(II) sulfate heptahydrate and manganese(II) sulfate pentahydrate were dissolved in distilled water so that the molar ratio of Ni, Co and Mn would be as shown in Table 6 and that the total concentration of Ni, Co and Mn would be 1.5 mol/kg to prepare an aqueous sulfate solution.

The same pH adjusting solution as in Ex. 1 was prepared.

Into a 2 L baffle-equipped glass reactor, distilled water was put and heated to 30° C. by a mantle heater, and the aqueous sulfate solution was added at a rate of 5.0 g/min for 25 hours with stirring by a two-stage tilt paddle type stirring blade. During addition of the aqueous sulfate solution, the pH adjusting solution was added so as to keep the pH in the reactor to be 8.5, to precipitate a carbonate compound (coprecipitate) containing Ni, Co and Mn. The initial pH of the mixture was 10. During the precipitation reaction, a nitrogen gas was made to flow at a rate of 2 L/min in the reactor so that the precipitated carbonate compound would not be oxidized. Further, as the precipitation method, the concentration method was employed, that is, during the reaction, a liquid containing no carbonate compound was continuously withdrawn using filter cloth so that the liquid amount in the reactor would not exceed 2 L. In order to remove impurity ions from the obtained carbonate compound, pressure filtration and dispersion in distilled water were repeated to wash the carbonate compound. Washing was completed at a point where the electrical conductivity of the filtrate became less than 20 mS/m, and the carbonate compound was dried at 120° C. for 15 hours.

Step (b):

The dried carbonate compound and lithium carbonate were mixed so that the molar ratio of Li and Me (Me is Ni, Co and Mn) (Li/Me) was as shown in Table 6.

In the air atmosphere, the mixture was subjected to temporary firing at 600° C. for 5 hours and then to main firing at 870° C. for 16 hours to obtain a lithium-containing composite oxide.

Step (c):

In the same manner as in Ex. 2, the lithium-containing composite oxide was washed and dried. The washed and dried lithium-containing composite oxide was used as a cathode active material.

The conditions for production of the lithium-containing composite oxide, the physical properties of the carbonate compound, the physical properties of the cathode active material (lithium-containing composite oxide) and the results of evaluation of the lithium secondary battery are shown in Tables 6 and 7. A scanning electron microphotograph of the cathode active material is shown in FIG. 1.

Ex. 7

Step (a):

The same aqueous sulfate solution as in Ex. 6 was prepared, and the same pH adjusting solution as in Ex. 1 was prepared.

Into a 2 L baffle-equipped glass reactor, distilled water was put and heated to 40° C. by a mantle heater, and the aqueous sulfate solution was added at a rate of 5.0 g/min. Further, into the reactor, a homogenizer (ULTRA-TURRAX T50 digital manufactured by IKA) was inserted, and a shearing force was applied to the mixture at 5,000 rpm. During addition of the aqueous sulfate solution, the pH adjusting solution was added so as to keep the pH in the reactor to be 8, to precipitate a carbonate compound (coprecipitate) containing Ni, Co and Mn. The initial pH of the mixture was 7. During the precipitation reaction, a nitrogen gas was made to flow at a rate of 2 L/min in the reactor so that the precipitated carbonate compound would not be oxidized. Further, as the precipitation method, the overflow method was employed, that is, during the reaction, the mixture was withdrawn from an overflow port so that the liquid amount in the reactor would not exceed 2 L. The overflowing carbonate compound over a period of from 18 to 50 hours after initiation of the reaction was recovered. In order to remove impurity ions from the obtained carbonate compound, pressure filtration and dispersion in distilled water were repeated to wash the carbonate compound. Washing was completed at a point where the electrical conductivity of the filtrate became less than 20 mS/m, and the carbonate compound was dried at 120° C. for 15 hours.

Step (b):

In the same manner as in Ex. 6 except that the firing conditions were changed as identified in Table 6, the mixture was fired to obtain a lithium-containing composite oxide.

Step (c):

In the same manner as in Ex. 2, the lithium-containing composite oxide was washed and dried. The washed and dried lithium-containing composite oxide was used as a cathode active material.

Figure 2:
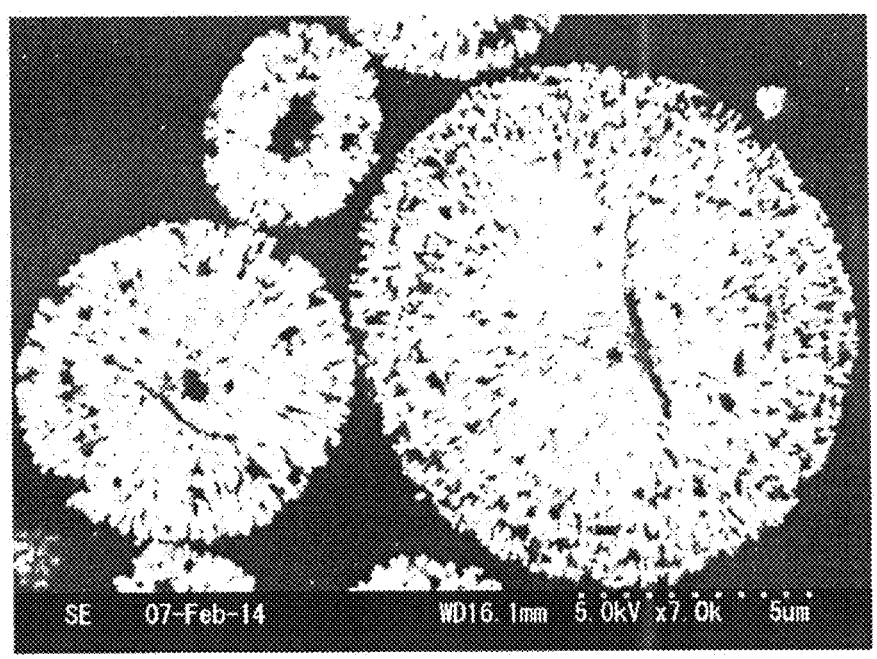
FIG. 2 is a scanning electron microphotograph of a cross section of the cathode active material in Ex. 7.

The conditions for production of the lithium-containing composite oxide, the physical properties of the carbonate compound, the physical properties of the cathode active material (lithium-containing composite oxide) and the results of evaluation of the lithium secondary battery are shown in Tables 6 and 7. A scanning electron microphotograph of the cathode active material is shown in FIG. 2.

Ex. 8

Step (a):

The same aqueous sulfate solution as in Ex. 6 was prepared, and the same pH adjusting solution as in Ex. 1 was prepared.

Into a 2 L baffle-equipped glass reactor connected to an external circulation line, distilled water was put and heated to 40° C. by a mantle heater, and the aqueous sulfate solution was added at a rate of 5.0 g/min with stirring by a two-stage tilt paddle type stirring blade. Further, the mixture in the reactor was circulated in the external circulation line at 1 L/min, and a shearing force was applied to the mixture at 12,000 rpm by a dispersing machine (ultrahigh speed multi-stirring system ROBMIX manufactured by PRIMIX Corporation) provided in the middle of the external circulation line. During addition of the aqueous sulfate solution, the pH adjusting solution was added so as to keep the pH in the reactor to be 8, to precipitate a carbonate compound (coprecipitate) containing Ni, Co and Mn. The initial pH of the mixture was 7. During the precipitation reaction, a nitrogen gas was made to flow at a rate of 2 L/min in the reactor so that the precipitated carbonate compound would not be oxidized. Further, as the precipitation method, the overflow method was employed, that is, during the reaction, the mixture was withdrawn from an overflow port so that the liquid amount in the reactor would not exceed 2 L. The overflowing carbonate compound over a period of from 22 to 49 hours after initiation of the reaction was recovered. In order to remove impurity ions from the obtained carbonate compound, pressure filtration and dispersion in distilled water were repeated to wash the carbonate compound. Washing was completed at a point where the electrical conductivity of the filtrate became less than 20 mS/m, and the carbonate compound was dried at 120° C. for 15 hours.

Step (b):

In the same manner as in Ex. 6 except that the firing conditions were changed as identified in Table 6, the mixture was fired to obtain a lithium-containing composite oxide.

Step (c):

In the same manner as in Ex. 2, the lithium-containing composite oxide was washed and dried. The washed and dried lithium-containing composite oxide was used as a cathode active material.

The conditions for production of the lithium-containing composite oxide, the physical properties of the carbonate compound, the physical properties of the cathode active material (lithium-containing composite oxide) and the results of evaluation of the lithium secondary battery are shown in Tables 6 and 7.

TABLE 6

| | Step (a) | | | | | | | | | | Carbonate compound | |
|---|---|---|---|---|---|---|---|---|---|---|---|---|
| | Charge [mol %] | | | Precipitation | Shearing condition | Initial | Controlled | Time | Temperature | | Specific surface area |
| Ex. | Ni | Co | Mn | method | [rpm] | pH | pH | [Hr] | [° C.] | $D_{50}$ [μm] | [m²/g] |
| 6 | 18.75 | 12.50 | 68.75 | Concentration method | — | 10 | 8.5 | 25 | 30 | 10.5 | 131.8 |
| 7 | 18.75 | 12.50 | 68.75 | OF method | 5000 | 7 | 8 | 18-50 | 40 | 6.1 | 104.0 |
| 8 | 18.75 | 12.50 | 68.75 | OF method | 12000 | 7 | 8 | 22-49 | 40 | 9.7 | 114.0 |

| | Step (b) | | | | | | | |
|---|---|---|---|---|---|---|---|---|
| | Charge | Temporary firing | | | Main firing | | | |
| Ex. | Li/Me | Temperature [° C.] | Time [Hr] | Atmosphere | Temperature [° C.] | Time [Hr] | Atmosphere | Step (c) |
| 6 | 1.500 | 600 | 5 | Air | 870 | 16 | Air | Conducted |
| 7 | 1.500 | 600 | 5 | Air | 865 | 16 | Air | Conducted |
| 8 | 1.500 | 600 | 5 | Air | 890 | 16 | Air | Conducted |

OF method: overflow method

TABLE 7

| | Cathode active material (lithium-containing composite oxide) | | | | | | | | | Evaluation | | | | |
|---|---|---|---|---|---|---|---|---|---|---|---|---|---|---|
| | $D_{50}$ | Specific surface area | Cross section | Porosity | Percentage of maximum | Analytical composition | | | | Initial DCR | DCR after cycle | DCR increase | Charge capacity | Discharge capacity |
| Ex. | [μm] | [m²/g] | SEM | [%] | void [%] | x | a | b | c | $I_{020}/I_{003}$ | [Ω] | [Ω] | [%] | [mAh/g] | [mAh/g] |
| 6 | 9.9 | 2.05 | Hollow | 21.17 | 19.20 | 1.5 | 0.1858 | 0.1255 | 0.6886 | 0.11 | 19.1 | 88.6 | 363 | 348.5 | 298.0 |
| 7 | 5.9 | 3.11 | Solid | 11.27 | 1.940 | 1.5 | 0.1892 | 0.1233 | 0.6875 | 0.08 | 18.4 | 71.6 | 288 | 352.7 | 299.6 |
| 8 | 9.1 | 3.39 | Solid | 16.02 | 0.830 | 1.5 | 0.1876 | 0.1233 | 0.6891 | 0.09 | 16.9 | 59.2 | 251 | 345.8 | 301.6 |

By comparison between the cathode active material in Ex. 6 and the cathode active materials in Ex. 7 and 8 which have substantially the same composition of the lithium-containing composite oxide, the cathode active materials in Ex. 7 and 8 have a porosity and a percentage of the maximum void in the cross section of the secondary particles lower than those of the cathode active material in Ex. 6. Thus, in Ex. 7 and 8, an increase of DCR of the lithium ion secondary battery is suppressed even when a charge and discharge cycle is repeatedly carried out.

INDUSTRIAL APPLICABILITY

According to the cathode active material of the present invention, it is possible to obtain a lithium ion secondary battery which has a high discharge capacity, of which initial DCR is not high, and of which an increase of DCR is suppressed even when a charge and discharge cycle is repeatedly carried out.

The entire disclosures of Japanese Patent Application No. 2014-149929 filed on Jul. 23, 2014 including specifications, claims, drawings and summaries are incorporated herein by reference in their entireties.

What is claimed is:

1. A cathode active material comprising secondary particles having a plurality of primary particles of a lithium-containing composite oxide agglomerated, wherein the lithium-containing composite oxide is represented by $Li_xNi_aCo_bMn_cM_dO_y$ (wherein x is from 1.1 to 1.7, a is from 0.15 to 0.5, b is from 0 to 0.33, c is from 0.33 to 0.85, M is a metal element other than Li, Ni, Co and Mn, d is from 0 to 0.05, a+b+c+d=1, and y is the number of moles of oxygen element (O) required to satisfy the valences of Li, Ni, Co, Mn and M), in an X-ray diffraction pattern of the lithium-containing composite oxide, the ratio of the integrated intensity $I_{020}$ of a peak of (020) plane attributable to a crystal structure with space group C2/m to the integrated intensity $I_{003}$ of a peak of (003) plane attributable to a crystal structure with space group R–3m ($I_{020}/I_{003}$) is from 0.02 to 0.3, the percentage of the total area $P_{total}$ of voids in a cross section of the secondary particles to the area S of the cross section (($P_{total}$/S)×100) is from 5 to 20%, and the percentage of the area $P_{max}$ of the maximum void in a cross section of the secondary particles to the area S of the cross section (($P_{max}$/S)×100) is from 0.1 to 10%.

2. The cathode active material according to claim 1, wherein $D_{50}$ of the cathode active material is from 3 to 15 μm.

3. The cathode active material according to claim 1, wherein the specific surface area of the cathode active material is from 0.1 to 10 m²/g.

4. A positive electrode for a lithium ion secondary battery, which comprises the cathode active material as defined in claim 1, an electrically conductive material and a binder.

5. A lithium ion secondary battery, which comprises the positive electrode for a lithium ion secondary battery as defined in claim 4, a negative electrode and a non-aqueous electrolyte.

* * * * *